June 9, 1936.  M. C. BACON  2,043,315

TREAD STOCK FOR INNER TUBES

Filed July 9, 1932

INVENTOR
*Morrison C. Bacon*
BY *Evans & McCoy*
ATTORNEYS

Patented June 9, 1936

2,043,315

UNITED STATES PATENT OFFICE 2,043,315

TREAD STOCK FOR INNER TUBES

Morrison C. Bacon, Garrettsville, Ohio

Application July 9, 1932, Serial No. 621,614

2 Claims. (Cl. 152—13)

This invention relates to detachable puncture-proof and cushioning stock for application to the tread of inner tubes for pneumatic tires and has for its object to provide cushioning and puncture-resisting tread stock in the form of an adhesive strip adapted to be applied directly to a vulcanized inner tube for pneumatic tires.

It is an object of the present invention to provide cushioning tread stock in the form of a strip adapted to adhere to a vulcanized inner tube upon application to the tube and form a protective covering for the tread portion thereof which resist puncture, aids air retention and protects the tube against damage by pinching within a broken tire casing.

A further object is to provide a protective tread strip which is inexpensive to manufacture and which can be quickly and easily applied to inner tubes either by the manufacturer or the user.

A further object is to provide a cushioning tread strip composed of an outer layer of elastic vulcanized sheet rubber and an inner narrower layer of a tacky puncture-sealing composition in sheet form which is adhesively secured to the inner face of the elastic strip centrally thereof so that the longitudinal margins of the elastic strip extend laterally beyond the sealing material, the sealing material being tacky and the inner surface of the elastic strip at its margin having a tacky inner surface so that when the strip is applied to a tube it will adhere thereto throughout its entire inner surface.

A further object is to provide an adhesive cushioning and puncture-resisting tread strip which has a non-hardening, adhesive inner surface which will stick to a vulcanized tube when applied to the tube and which can be peeled off the tube when desired to permit repair of a covered portion of the tube.

With the above and other objects in view the invention may be said to comprise a cushioning and puncture-resisting tread for inner tubes, as illustrated in the accompanying drawing hereinafter described and particularly set forth in the appended claims together with such variations and modifications thereof as will be apparent to one skilled in the art to which the invention appertains.

Reference should be had to the accompanying drawing forming a part of this specification, in which.

The device of the present invention is an adhesive cushioning and puncture-resisting strip or endless band adapted to be applied directly to a finished inner tube for pneumatic tires.

Figure 1:
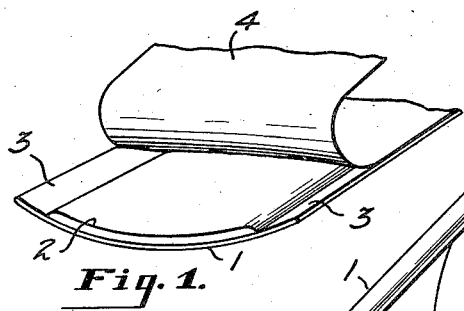
Figure 1 is a fragmentary perspective view showing a portion of a cushioning and puncture-resisting strip.

As shown in Fig. 1 of the drawing the adhesive tread strip consists of an outer layer 1 in the form of a continuous strip of elastic vulcanized sheet rubber which is similar to tire patch stock, having a tacky inner surface composed of unvulcanized or partially vulcanized rubber, together with a strip of puncture-filling material 2 which is in the form of a strip of sheet material adhesively secured to the inner surface of the elastic rubber strip 1. The strip 2 is in sheet form and preferably composed of a rubber composition which is unvulcanized or partially vulcanized but which is sufficiently tacky to adhere to a rubber surface to which it is applied. The puncture filling material is somewhat narrower than the elastic rubber strip so that longitudinal margins 3 of the elastic rubber strip are exposed on opposite sides of the strip of puncture-filling material. The puncture-filling material, by reason of its tacky nature and by reason of the tacky inner surface of the elastic rubber strip, will firmly adhere to the elastic rubber strip upon application thereto. Since the inner surfaces of the puncture-filling strip and the elastic strip are tacky the entire inner surface of the tread strip will readily adhere to any clean rubber surface to which it is applied. To protect the adhesive inner surface of the tread stock which may be manufactured in strips of considerable length, a strip 4 of holland cloth or like material which can be stripped off prior to application of the tread stock to an inner tube 5 is applied to the sticky inner surface.

Figure 2:
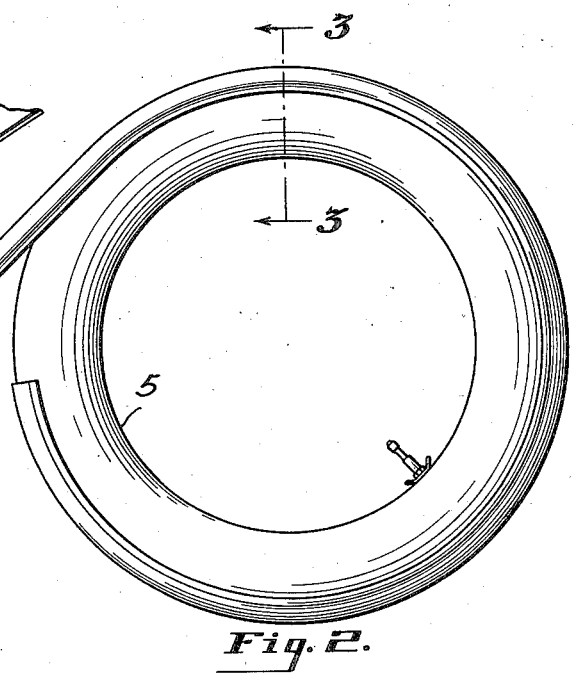
Fig. 2 is a side elevation showing an inner tube with the tread strip applied thereto.

In applying the tread strip to an inner tube the inner tube is inflated as shown in Fig. 2. Its tread surface is cleaned by sponging with gasoline or other suitable cleaning fluid, a strip of tread stock of a length corresponding to the circumference of the inner tube is cut off, the holland cloth is peeled from the strip and the strip is then applied by pressing it against the periphery of the tube 5. The adhesive strip may be formed with a lateral curvature to conform to the curvature of the tube or may be made flat and pressed into conformity with the tube while it is being applied to the tube.

As previously explained, the entire inner surface of the tread strip is tacky and will adhere to the surface of the tube when it is pressed against the surface.

Figure 3:
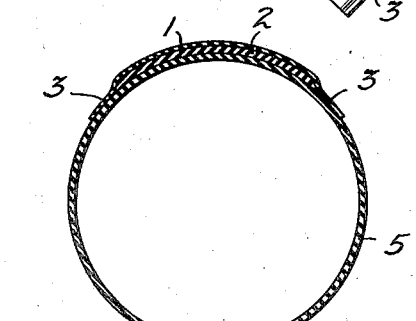
Fig. 3 is a transverse section through an inner tube with the cushioning and puncture-resisting tread strip applied thereto.

As shown in Fig. 3 of the drawing the marginal edges of the elastic covering strip 1 are adhesively secured directly to the tube along opposite sides of the puncture filling strip 2, so that the puncture-filling material is firmly held against displacement on the inner tube. The tacky, puncture-filling material and the tacky material of the inner surface of the elastic covering strip are non-hardening adhesives so that if a portion of the inner tube under the tread strip should become damaged a portion of the tread strip can be peeled away to permit access to the damaged portion and can be reapplied to the tube after a repair has been made.

Figure 4:
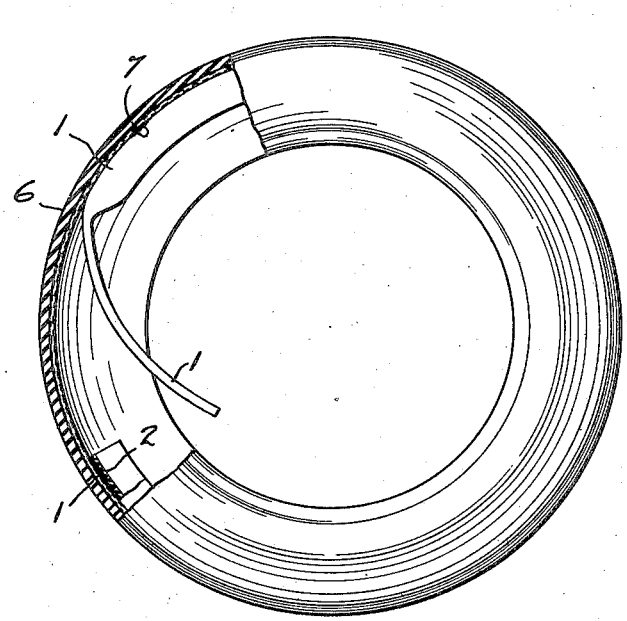
Fig. 4 is a side elevation showing a pneumatic tire casing with the inner tube protecting strip applied thereto.
Figure 5:
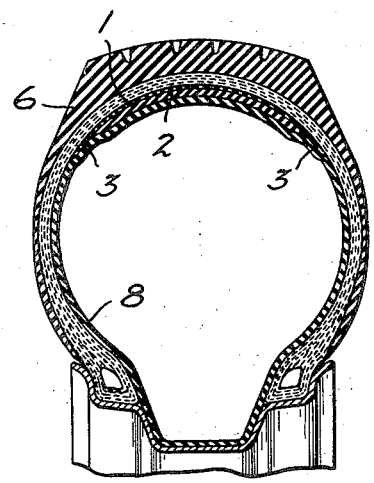
Fig. 5 is a sectional view showing a tire casing with an inner tube therein and with the puncture-resisting and cushioning strip adhesively secured to the interior of the tire casing and to the exterior of the inner tube.

Figs. 4 and 5 of the drawing illustrates a further application of the invention in which a length of the adhesive tread strip is applied to the interior of a pneumatic tire casing 6. The adhesive strip is inserted in the tire casing 6 with the covering strip 1 thereof against the interior of the casing and with its tacky inner surface in position to engage the periphery of an inner tube within the casing. The elastic strip 1 is preferably attached to the tire casing by spots of cement or the like, as indicated at 7, and after the strip has been applied to the interior of the tire casing an inner tube 8 is inserted into the casing. Upon inflation of the tube 8 the tread wall of the inner tube will be pressed outwardly against the tacky inner surface of the adhesive strip, so that the inner tube is firmly united to the tread strip throughout its periphery.

The tread strips do not adhere as firmly to the interior of a tire casing as they do to the tread portion of inner tubes, so that if an inner tube is removed from the casing the tread strip will peel away from the interior of the tire casing and come out with the inner tube.

It will be apparent that the present invention provides a cushioning and puncture-resisting strip which may be quickly and easily applied to an inner tube and which serves to greatly enhance the puncture and wear resisting qualities of the tube at a small cost.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. Tread stock for application to vulcanized inner tubes comprising an adhesive strip for application to the tube, said strip being composed of an outer layer in the form of a strip of elastic vulcanized sheet rubber of uniform thickness and of a width to cover the tread portion of an inner tube and having a non-hardening tacky inner surface and an inner layer in the form of a relatively soft and tacky strip of self-sustaining rubber puncture filling composition adhesively secured to the inner surface of the elastic rubber, said puncture filling strip being of substantially uniform thickness, said tread strip being removable as a unit from a tube to which it has been applied.

2. Tread stock for application to vulcanized inner tubes comprising an adhesive strip for application to the tube, said strip being composed of an outer layer in the form of a strip of elastic vulcanized sheet rubber of uniform thickness and of a width to cover the tread portion of an inner tube and having a non-hardening tacky inner surface and an inner layer in the form of a relatively soft and tacky strip of self-sustaining rubber puncture filling composition adhesively secured to the inner surface of the elastic rubber, said puncture filling strip being of substantially uniform thickness and of less width than the outer strip and secured centrally thereon so that the elastic strip has marginal edges adapted to adhere directly to the inner tube along opposite sides of the puncture filling strip, said tread strip being removable as a unit from a tube to which it has been applied.

MORRISON C. BACON.